(No Model.)

W. S. HOSKINS.
WRENCH.

No. 419,254. Patented Jan. 14, 1890.

WITNESSES:
Donn Twitchell
C. Sedgwick

INVENTOR:
W. S. Hoskins
BY Munn & Co.
ATTORNEYS.

UNITED STATES PATENT OFFICE.

WILLIAM S. HOSKINS, OF BROOKHAVEN, MISSISSIPPI.

WRENCH.

SPECIFICATION forming part of Letters Patent No. 419,254, dated January 14, 1890.

Application filed March 19, 1889. Serial No. 303,868. (No model.)

*To all whom it may concern:*

Be it known that I, WILLIAM S. HOSKINS, of Brookhaven, in the county of Lincoln and State of Mississippi, have invented a new and useful Improvement in Monkey-Wrenches, of which the following is a full, clear, and exact description.

My invention relates to implements for the use of machinists, engineers, and others, and is an improvement in monkey-wrenches. Its objects are to so construct a monkey-wrench that the adjustments of its movable jaw may be more quickly made, and also to enable said jaw and its bearing to be set upon or released from the adjusting-screw at the will of the operator, and by such release to further expedite the adjustment of said jaw.

Reference is to be had to the accompanying drawings, forming a part of this specification, in which similar letters of reference indicate corresponding parts in all the figures.

Figure 1:
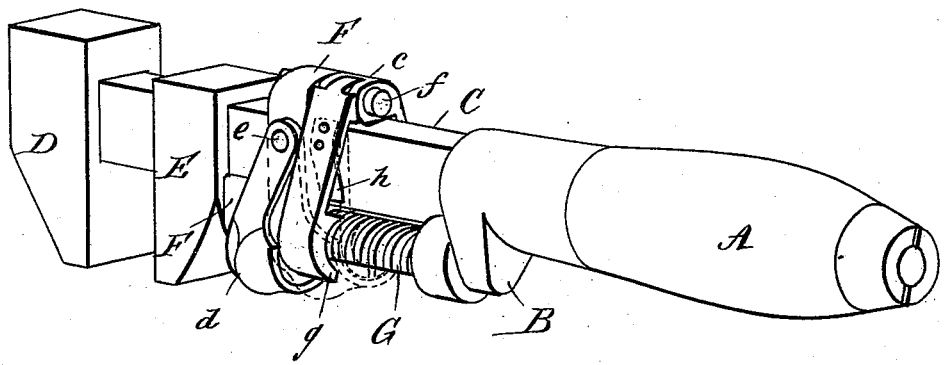
Figure 2:
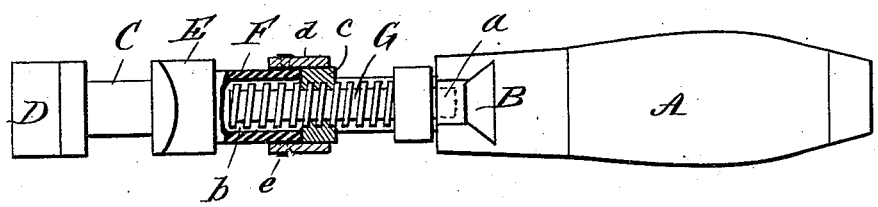
Figure 3:
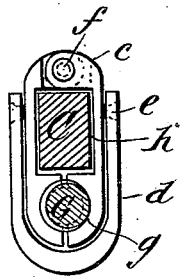

Figure 1 is a view in perspective of a wrench, showing my improved adjustable locking device applied thereto. Fig. 2 is a bottom view of the same and a longitudinal sectional view of the adjustable locking device. Fig. 3 is a vertical sectional view of the bar, adjusting-screw, and locking device.

Referring to said drawings, A is the handle of the wrench; B, its fixed bearing; C, its bar; D, its fixed jaw; E, its movable jaw; F, its slide-bearing, and G its adjusting-screw.

$a$ and $b$ are sockets in the bearings B and F. $c$ is a split nut on the bar C, and $d$ is a clamp on the bearing F.

The handle, bar, fixed and movable jaws, and bearings are of the construction common to monkey-wrenches. The socket $b$ in the bearing F is of a diameter greater than that of the screw, and said bearing traverses the bar without engagement with the screw, except when the split nut is closed. The clamp $d$ has a flanged head, which is shaped interiorly to conform to the face of the bearing F and the split nut $c$, and said clamp is pivoted at $e$ to the bearing F. The halves of the nut $c$ are dovetailed together at one end and turn slightly on the bolt $f$, which connects the nut to the bearing F. The halves of the nut $c$ are constructed to loosely embrace the bar C, and are provided with curved jaws $g$, having a threaded face. Between the bar C and the halves of the nut $c$ are located flat springs $h$.

In operating my invention, the jaw E is placed at any desired point on the bar C, the nut $c$ is pressed upon the screw G, and the clamp $d$ is pushed down over said nut. If the jaws D and E do not grip tight enough upon the article between them, a slight revolution of the screw will secure the end desired, the screw engaging the nut $c$ and carrying said jaw forward. The jaw E is loosened again by either turning the screw or by freeing the nut $c$ from the clamp $d$. In the latter case, as soon as the clamp is pushed back upon the bearing F the springs $h$ exert themselves, throw open the nut $c$, and liberate its jaws from the screw. The jaw E is then free to be passed forward or backward on the bar C.

The construction of my improved wrench is so simple that any one can easily and efficiently operate it, its adjustments are more readily made than in the case of an ordinary monkey-wrench, it is light and handy to use, and it does not easily get out of order.

Having thus described my invention, what I claim as new, and desire to secure by Letters Patent, is—

1. In a wrench, the combination, with the body-bar, the adjusting-screw, and the movable jaw, of a split nut pivoted on the movable jaw and capable of engaging the adjusting-screw, and a clamp pivoted on the movable jaw and capable of engaging the members of the split nut, substantially as shown and described.

2. In a wrench, the combination, with the body-bar, the adjusting-screw, and the movable jaw, of a split nut pivoted on the movable jaw and capable of engaging the adjusting-screw, springs intervening the members of the split nut and the body-bar, and a clamp pivoted on the movable jaw and capable of engaging the members of the split nut, substantially as shown and described.

WILLIAM S. HOSKINS.

Witnesses:
B. T. ATKINS,
H. CASSEDY.